United States Patent
Gaertner et al.

(10) Patent No.: US 12,163,556 B2
(45) Date of Patent: Dec. 10, 2024

(54) ANTI-FRICTION BEARING COMPRISING A DISCHARGING DEVICE, AND METHOD FOR THE DISCHARGE OF ELECTROSTATIC CHARGES

(71) Applicant: SCHUNK KOHLENSTOFFTECHNIK GMBH, Heuchelheim (DE)

(72) Inventors: Ralf Gaertner, Lahnau (DE); Steffen Weller, Wetzlar (DE)

(73) Assignee: SCHUNK KOHLENSTOFFTECHNIK GMBH, Heuchelheim (DE)

( * ) Notice: Subject to any disclaimer, the term of this patent is extended or adjusted under 35 U.S.C. 154(b) by 117 days.

(21) Appl. No.: 17/921,428

(22) PCT Filed: Apr. 27, 2020

(86) PCT No.: PCT/EP2020/061634
§ 371 (c)(1),
(2) Date: Oct. 26, 2022

(87) PCT Pub. No.: WO2021/219194
PCT Pub. Date: Nov. 4, 2021

(65) Prior Publication Data
US 2023/0193958 A1 Jun. 22, 2023

(51) Int. Cl.
*F16C 19/06* (2006.01)
*F16C 19/52* (2006.01)
*F16C 41/00* (2006.01)

(52) U.S. Cl.
CPC ............ *F16C 41/002* (2013.01); *F16C 19/06* (2013.01); *F16C 19/52* (2013.01)

(58) Field of Classification Search
CPC ......... F16C 19/06; F16C 19/52; F16C 41/002
See application file for complete search history.

(56) References Cited

U.S. PATENT DOCUMENTS 3,271,723 A * 9/1966 Willing ................. F16C 41/002
439/17
3,564,477 A * 2/1971 Pompei ................ H02K 13/003
439/271

(Continued)

FOREIGN PATENT DOCUMENTS

DE 29916854 U1 * 1/2000 .......... F16C 33/7843
DE 102015223509 A1 * 3/2017

(Continued)

OTHER PUBLICATIONS

JPH048820U_Description.*
PCT International Search Report and Written Opinion, PCT/EP2020/061634, Jan. 28, 2021, 15 pages.

*Primary Examiner* — Phillip A Johnson
(74) *Attorney, Agent, or Firm* — Quarles & Brady LLP

(57) ABSTRACT

A roller bearing including a conduction apparatus and a method for conducting electrostatic charges at a roller bearing, the conduction apparatus including at least one elastic conductor having a first conductor section and a second conductor section for forming a contact assembly on the roller bearing, the first conductor section being mounted on a first bearing ring of the roller bearing and the second conductor section being mounted on a second bearing ring of the roller bearing, an electrically conductive connection being established between the first bearing ring and the second bearing ring. The conductor is supported at the first bearing ring, the first conductor section being inserted into at least a straight recess of the first bearing ring.

20 Claims, 2 Drawing Sheets

(56) References Cited

U.S. PATENT DOCUMENTS

| 10,253,818 B1* | 4/2019 | Ince | F16C 33/7843 |
| 2017/0276179 A1* | 9/2017 | Hutchison | F16C 33/583 |

FOREIGN PATENT DOCUMENTS

| DE | 102017106695 B3 * | 4/2018 | F16C 33/7876 |
| EP | 3228890 A1 | 10/2017 | |
| JP | H048820 U | 1/1992 | |
| JP | H0656521 U * | 8/1994 | |
| JP | H0682438 U | 11/1994 | |
| JP | H0720414 Y2 * | 5/1995 | |
| JP | 11218143 A * | 8/1999 | F16C 33/7846 |
| JP | 2002295492 A * | 10/2002 | F16C 33/723 |
| JP | 2005114119 A | 4/2005 | |
| WO | 2016095959 A1 | 6/2016 | |

\* cited by examiner

ANTI-FRICTION BEARING COMPRISING A DISCHARGING DEVICE, AND METHOD FOR THE DISCHARGE OF ELECTROSTATIC CHARGES

The present application is a national stage application filed under 35 U.S.C. § 371 of International Application No. PCT/EP2020/061634, filed Apr. 27, 2020, which is incorporated herein by reference in its entirety for all purposes.

The disclosure relates to a roller bearing comprising a conduction apparatus and to a method for conducting electrostatic charges at a roller bearing, the conduction apparatus comprising at least one elastic conductor, the conductor having a first conductor section and a second conductor section for forming a contact assembly on the roller bearing, the first conductor section being mounted on a first bearing ring of the roller bearing and the second conductor section being mounted on a second bearing ring of the roller bearing, an electrically conductive connection being established between the first bearing ring and the second bearing ring by means of the conductor.

Roller bearings of the type mentioned above are sufficiently known from the state of the art. For instance, roller bearings can have conduction apparatuses which are formed by a device disposed adjacent to the roller bearing. A disadvantage of this is that devices of this kind require a relatively large installation space which, however, is often not available around the roller bearing.

Alternatively, the conduction apparatus can comprise an elastic conductor, which is clamped between the first and the second bearing ring while forming a prestressing so that the conduction apparatus does not protrude from the roller bearing and thus does not require additional installation space. For this purpose, it is required that the conductor has a curved form, e.g., a U-shaped form, a V-shaped form, a wave form, a spiral form or the like, via which the conductor bridges a space between the bearing rings when contacting the same. The conductor must be inserted into the roller bearing while a prestressing of the conductor takes place, the prestressing being suitable for fixedly mounting the conductor on the roller bearing.

A disadvantage is that each conductor must be produced specifically for each corresponding roller bearing and moreover must have a correspondingly, relatively complex shape. Producing such a conductor is therefore particularly labor and thus cost-intensive. A conductor which is too large or too wide for the roller bearing may not be able to be clamped into the roller bearing, whereby electrostatic charges could no longer be conducted at the roller bearing. A conductor which in contrast is too small or not wide enough for the roller bearing bears the risk of falling out of the roller bearing and thus of the conduction apparatus losing contact with the roller bearing during operation, whereby a conduction of electrostatic charge at the roller bearing is interrupted. This carries the risk of the roller bearing becoming damaged by vagrant currents. Conductors which do not precisely fit the roller bearing can also be mounted having a too large prestressing in the roller bearing. Mounting such an unsuitable conduction apparatus can also lead to the conductor jumping out of the roller bearing, e.g., due to a too large prestressing, whereby contact with the roller bearing is also lost and the conduction of electrostatic charges at the roller bearing is also interrupted.

It is therefore the object of the disclosure at hand to propose a roller bearing comprising a conduction apparatus and a method for conducting electric currents at the roller bearing, the conduction apparatus being able to be easily and inexpensively produced and be safely mounted on the roller bearing while also enabling reliably conducting electrostatic charges at the roller bearing.

This object is attained by a roller bearing having the features of claim 1 and a method having the features of claim 20.

The roller bearing comprises a conduction apparatus, the conduction apparatus comprising at least one elastic conductor, the conductor having a first conductor section and a second conductor section for forming a contact assembly on the roller bearing, the first conductor section being mounted on a first bearing ring of the roller bearing and the second conductor section being mounted on a second bearing ring of the roller bearing, an electrically conductive connection being established between the first bearing ring and the second bearing ring by means of the conductor, the conductor being supported at the first bearing ring, the first conductor section being inserted into at least a straight recess of the first bearing ring.

With the roller bearing according to the disclosure, the conduction apparatus is formed particularly simply, the conductor not having to be clamped between the bearing rings of the roller bearing and thus not having to have a complex form. Instead, the disclosure intends for the conductor to be fixed to the first bearing ring, the first conductor section of the conductor being inserted in a recess of the first bearing ring expressly shaped for this purpose. The second conductor section, which in contrast is not supported in a recess, contacts the second bearing ring of the roller bearing, the second bearing ring being able to move relatively freely at the second bearing ring. For this purpose, the conduction apparatus can be disposed on the roller bearing in such a manner that the conductor does not touch the roller bearing and thus a functionality of the roller bearing is not impeded. According to the disclosure, the recess is straight and can be groove or a bore, for example. The recess can be formed particularly easily and can be easily retrofitted after the roller bearing has been produced. Furthermore, it is conceivable that not only one recess but a plurality of recesses can be formed in one or both bearing rings of the roller bearing, this plurality of recesses allowing on the one hand flexibly disposing a conductor on the roller bearing and on the other hand also disposing two or more conductors of the same conduction apparatus on the roller bearing. It is essential that the conductor need not be clamped between the bearing rings, thus minimizing the risk of the conductor jumping out during operating of the roller bearing.

Advantageously, the recess can be formed so as to conform with the conductor. The recess is then formed fittingly for the corresponding conductor cross section, meaning only such a conductor can be inserted and provided within the recess, the conductor being suitable for conducting correspondingly large currents at the roller bearing. To this end, the recess can have a cylindrical or partially cylindrical shape: however, other shapes for the recess are possible which are suitable for accommodating a corresponding conductor of the conduction apparatus. Furthermore, it is conceivable for the recess to be in the shape of a wedge or be a wedge-shaped groove, meaning the recess can accommodate conductors having differently sized diameters and, for example, allows clamping or fixing the conductor in the recess.

The conductor can be inserted into the recess in a force-fit, form-fit or substance-to-substance bonded manner. To this end, the conductors can be fastened to the recess in a clamped, wedged or other force-fit and/or form-fit manner when being inserted into the recess. Further or alternatively, the conductor can be glued, soldered or be connected in another substance-to-substance bonded manner to the bearing ring in the area of the recess. This kind of fastening of the conductor to the first bearing ring in the area of the recess can prevent the conductor from falling out of the recess in an effective manner, whereby the functionality of the conduction apparatus can be reliably ensured.

It is advantageous if the conductor is realized as a carbon fiber assembly made of a braid of carbon fibers, the carbon fiber assembly being able to be infiltrated with pyrolytic carbon. Conductors of this kind are easily producible and can be produced in large numbers at little cost. Forming the conductor from a carbon fiber assembly can also aid in attaining a dry lubrication in the area of the contact. Moreover, the conductor can obtain a form stability via an infiltration of the carbon fiber assembly with pyrolytic carbon, the form stability being able to be custom set during production of the conductor by choosing the degree of infiltration.

The first conductor section can be formed by an end of the conductor, the second conductor section being able to be formed by an opposite, free end of the conductor. In this case, the first conductor section can be fastened to the first bearing ring and the second bearing ring is contacted with the second conductor section, which can be formed on an unfastened and thus free end of the conductor. For this purpose, the conductor can overall be formed as long as the distance to be bridged by the conductor between the bearing rings and the roller bearing requires. In this instance, the free end of the conductor can directly contact the second bearing ring. Alternatively, it can also be intended that the conductor is longer than the distance to be bridged, meaning that a partial section of the second conductor section spaced apart therefrom can be intended for contacting the second bearing ring instead the free end itself. This contact can take place tangentially on the second bearing ring.

Alternatively, the first conductor section can comprise two partial sections on opposite ends of the conductor, the partial sections each being able to be inserted in recesses of the first bearing ring, the second conductor section being able to be formed between the partial sections inserted into the recesses. In this embodiment, both ends of the conductor are fixed in recesses of the first bearing ring, such that a section between the ends of the conductor forms the second conductor section for contacting the second bearing ring. In this case, the first bearing ring can have at least two recesses for receiving the partial sections of the first conductor section. Fastening the conductor in this manner on both ends can allow a particularly stable fixation of the conductor on the first bearing ring. Owing to the fact the free ends of the conductor do not directly contact the second bearing ring, a fraying of the ends of the conductor can moreover be prevented. Thus, a service life of a roller bearing having such a conductor of the conduction apparatus can be significantly increased.

Advantageously, the conductor can be straight or curved. Conductors formed in this manner can be easily and quickly cut at a desired length, for example, from a roll or a strand in large numbers. The conductors can, for example, have a carbon fiber assembly or, alternatively, be formed as a wire, preferably from a metal wire, for example a copper wire. After having been cut, the conductor can be directly disposed in the roller bearing in a coated or uncoated state.

Furthermore, it is advantageous if a contact force can be exerted on the second bearing ring by means of the conductor. For this purpose, the conductor can be formed flexibly or elastically and be disposed in such a manner on the roller bearing that the conductor forms the contact force. The contact force can, for example, be exerted in the form of a spring force of the conductor which comes to pass by the conductor acting as a leaf spring within the roller bearing owing to its stability or elasticity. By exerting the contact force, a loss of contact between the conductor fastened to the first bearing ring and the second bearing ring can be prevented.

Moreover, the contact force can be caused by a prestressing of the conductor, the conductor being able to be disposed on the bearing rings by producing the prestressing. In this context, it can be intended that the recess is realized in such a manner that it orients the conductor toward the second bearing ring while producing the prestressing. A corresponding angle of the straight recess on the first bearing ring can be set in such a manner that it does not correspond to the angle of a simple mounting of the conductor on the second bearing ring. It is essential that the conductor receives a prestressing after having been disposed on the roller bearing, i.e., after having been inserted into the recess of the first bearing ring and having been mounted on the second bearing ring, the prestressing being achieved by slightly bending the conductor, for example. The prestressing allows the conductor to exert the contact force on the second conductor section on the second bearing ring. This in turn ensures a safe contact of the bearing rings of the roller bearing via the conductor.

The roller bearing can be an axial bearing. In this context, an axial bearing or a thrust bearing is a deep groove ball thrust bearing, an axial cylinder roller bearing, a self-aligning roller thrust bearing, a taper roller thrust bearing.

To this end, the conductor can be disposed essentially parallel to a bearing axis of the roller bearing. If the conductor is realized as a rod-shaped conductor, it can be disposed entirely parallel to a bearing axis of the roller bearing. Alternatively, a curved conductor can be disposed essentially parallel to a bearing axis of the roller bearing. It is also conceivable that a rod-shaped or curved conductor is bent at the second bearing ring or has a bent end which can contact the second bearing ring.

The roller bearing can also be a plain bearing, the first conductor section being an outer conductor section for contacting an outer ring of the plain bearing and the second conductor section being an inner conductor ring for contacting an inner ring of the radial bearing, the conductor being supported on the outer ring or on the inner ring, the conductor being inserted in at least a recess of the outer ring or the inner ring by the first conductor section. In this context, a plain bearing is a deep groove ball bearing, an angular contact ball bearing, a four point bearing, a separable ball bearing, a self-aligning ball bearing, a cylindrical roller bearing, a tapered roller bearing, a spherical roller bearing, a needle bearing, a CARB toroidal roller bearing, a ball roller bearing or an insert bearing.

In this context, an outer periphery of the inner ring or an inner periphery of an outer ring can be contacted by means of the second conductor section, the second bearing section being able to be mounted to a radial groove of the inner ring or the outer ring. The second conductor section can be disposed on the outer periphery of the inner ring or the inner periphery of the outer ring so as to be movable; however it is fixed in position toward the bearing axis by the groove. The groove can be formed so as to conform with the conductor. By forming the groove according to the shape of the conductor, it can be prevented in an effective manner that the conductor section budges in or falls out of the groove. The second conductor section can be mounted on the groove by the second conductor section being disposed either on one end of the conductor or on one section between the ends of the conductor.

The conductor can be disposed tangentially on the inner ring and/or secantially on the outer ring. If the conductor is disposed tangentially on the inner ring, the second conductor section of the conductor can be mounted tangentially on the inner ring, the first conductor section of the conductor being able to be supported on the outer ring. Alternatively, the first conductor section of the conductor can be disposed secantially to the outer ring, the first conductor section of the conductor being able to be supported on the inner ring.

The recess can also be formed as a groove on at least a front face of the outer ring or the inner ring. Moreover, two or more recesses can be formed on a front face of the outer ring or the inner ring. The recesses can also be disposed on one or on both front faces of the outer ring or the inner ring. The recesses can be formed as a groove or as a bore. It is essential that the recess is straight and thus does not extend radially to the bearing axis on the outer ring or the inner ring.

Advantageously, the conduction apparatus can comprise two or more conductors in a conductor assembly, the first conductor sections of the conductor each being able to be inserted in recesses of the first bearing ring. The first bearing ring can have a corresponding number of recesses for fastening the conductor on the first bearing ring. In this context it is conceivable that at first only one conductor can be inserted into one of the recesses and one, two or more further conductors can be inserted into recesses of the first bearing ring if required. It is also possible for several conductors to be fastened to the first bearing ring simultaneously. In this case, the conductors can be mounted in the same manner by inserting the first conductor sections into recesses of the first bearing ring, which can make mounting the conduction apparatus particularly easy. Moreover, the use of two or more conductors in a conductor assembly can significantly reduce the risk of damage to the roller bearing via vagrant currents as at least one other functional conductor is available for conducting electrostatic charges at the roller bearing even if a conductor has become worn or has fallen out.

The conductors can be identical and be disposed in a rotationally symmetrical manner on the bearing rings with respect to a bearing axis of the roller bearing. If the conductors of the conduction apparatus are identical, they can be produced particularly easily and cannot be confused when being mounted on the bearing rings of the roller bearing and thus not be fastened in the wrong position. Such a simple mounting increases the safety when operating the roller bearing since a contact of the bearing rings with identical consumers is always ensured. Owing to the fact that the conductors can be disposed in a rotationally symmetrical manner, an even contact of the bearing rings of the roller bearing and thus an even conduction of electric currents can be caused.

Moreover, the conductors can be disposed in an axially symmetric manner on the bearing rings with respect to a diameter of the bearing rings. This can be the case when the first conductor section has two partial sections which can be inserted into recesses on the first bearing rings, meaning the second conductor section can be formed on the conductor between partial sections inserted into the recesses.

Alternatively, the conductors can be disposed in an axially symmetric manner on the bearing ring with respect to a diameter of the bearing rings. In this case, the conductors can be fixed on the first bearing ring on only one end, meaning a free end can form the second conductor section.

The method according to the disclosure serves for conducting an electrostatic charge at a roller bearing, the roller bearing comprising a conduction apparatus comprising at least one elastic conductor, the conductor being formed to have a first conductor section and a second conductor section for forming a contact assembly on the roller bearing, the first conductor section being mounted on a first bearing ring of the roller bearing and the second conductor section being mounted on a second bearing ring of the roller bearing, the conductor establishing an electrically conductive connection between the first bearing ring and the second bearing ring. The conductor is supported at the first bearing ring, the first conductor section being inserted into at least a straight recess of the first bearing ring. Reference is made to the description of advantages of the roller bearing according to the disclosure regarding the advantageous effects of the method. Advantageous embodiments of the method are derived from the description of features of the dependent claims referring to device claim 1.

In the following, preferred embodiments of the disclosure are described in further detail with reference to the attached drawings.

Figure 1:
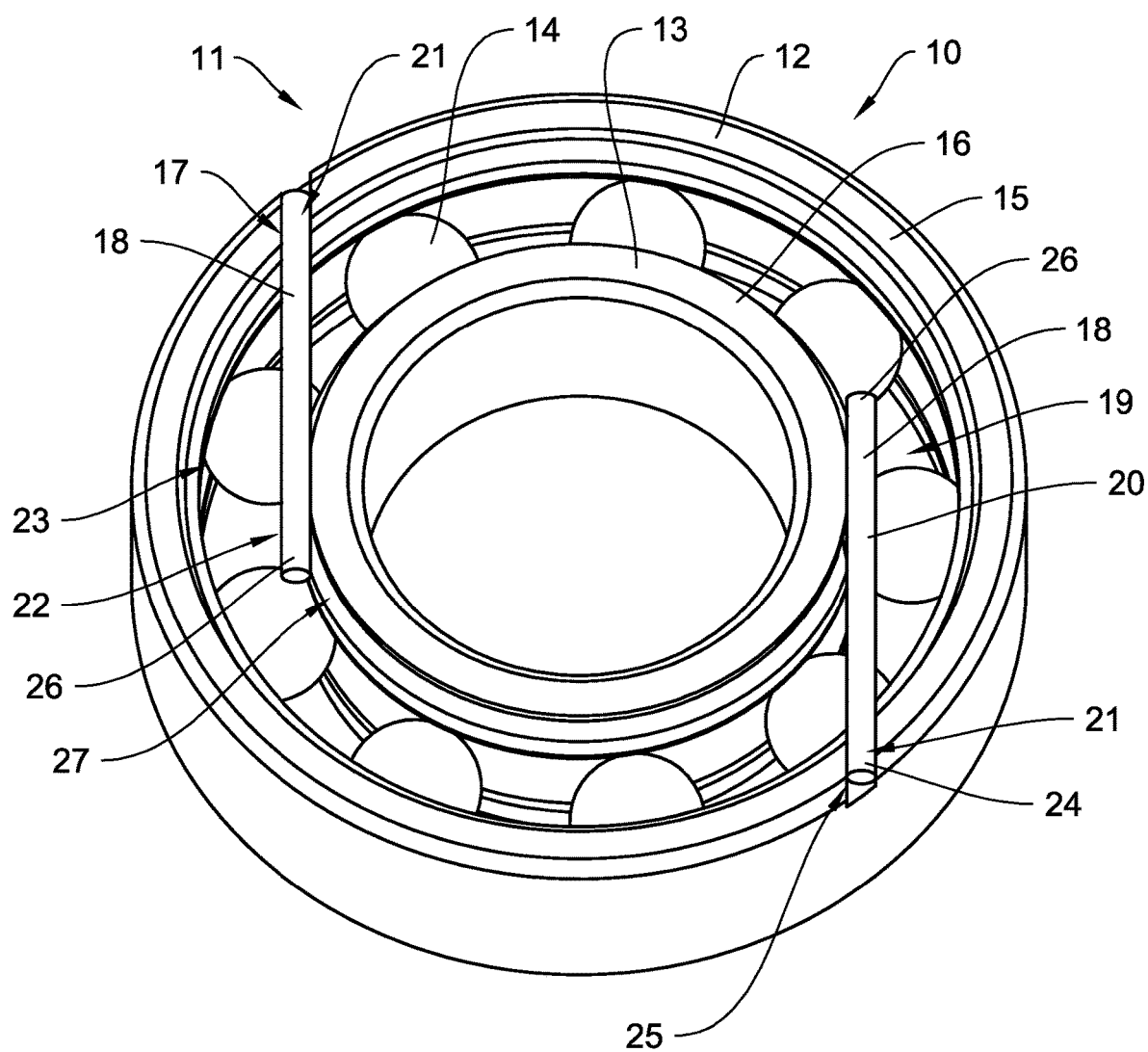
FIG. 1 shows a perspective view of a roller bearing in a first embodiment.

FIG. 1 shows a roller bearing 10 in the form of a ball bearing 11, which comprises a first bearing ring 12 and a second bearing ring 13 and rolling elements 14 disposed between bearing rings 12, 13. First bearing ring 12 is an outer ring 15 of roller bearing 10: second bearing ring 13 is an inner ring 16 of roller bearing 10. Furthermore, roller bearing 10 comprises a conduction apparatus 17, which comprises two conductors 18 in a conductor assembly 19. Conductors 18 are formed as carbon fiber assemblies 20, which are infiltrated with pyrolytic carbon. Conductors 18 each have a first conductor section 21 and a second conductor section 22 for forming a contact assembly 23 on roller bearing 10. In this context, first conductor section 21 is formed by an end 24 of a conductor 18 in each case, end 24 being inserted into a straight recess 25 of first bearing ring 12. An opposite end 26 of conductor 18 forms second conductor section 22, end 26 of conductor 18 being placed in a radial groove 27 of the second bearing ring. Second conductor section 22 is disposed within groove 27 so as to be moveable, whereas first conductor section 21 is fixed in recess 25. This assembly of conductor section 21, 22 allows establishing an electrically conductive connection between bearing rings 12, 13 by means of conductor 18, whereby electrostatic charges can be conducted from roller bearing 10, without requiring additional installation space around roller bearing 10.

Figure 2:
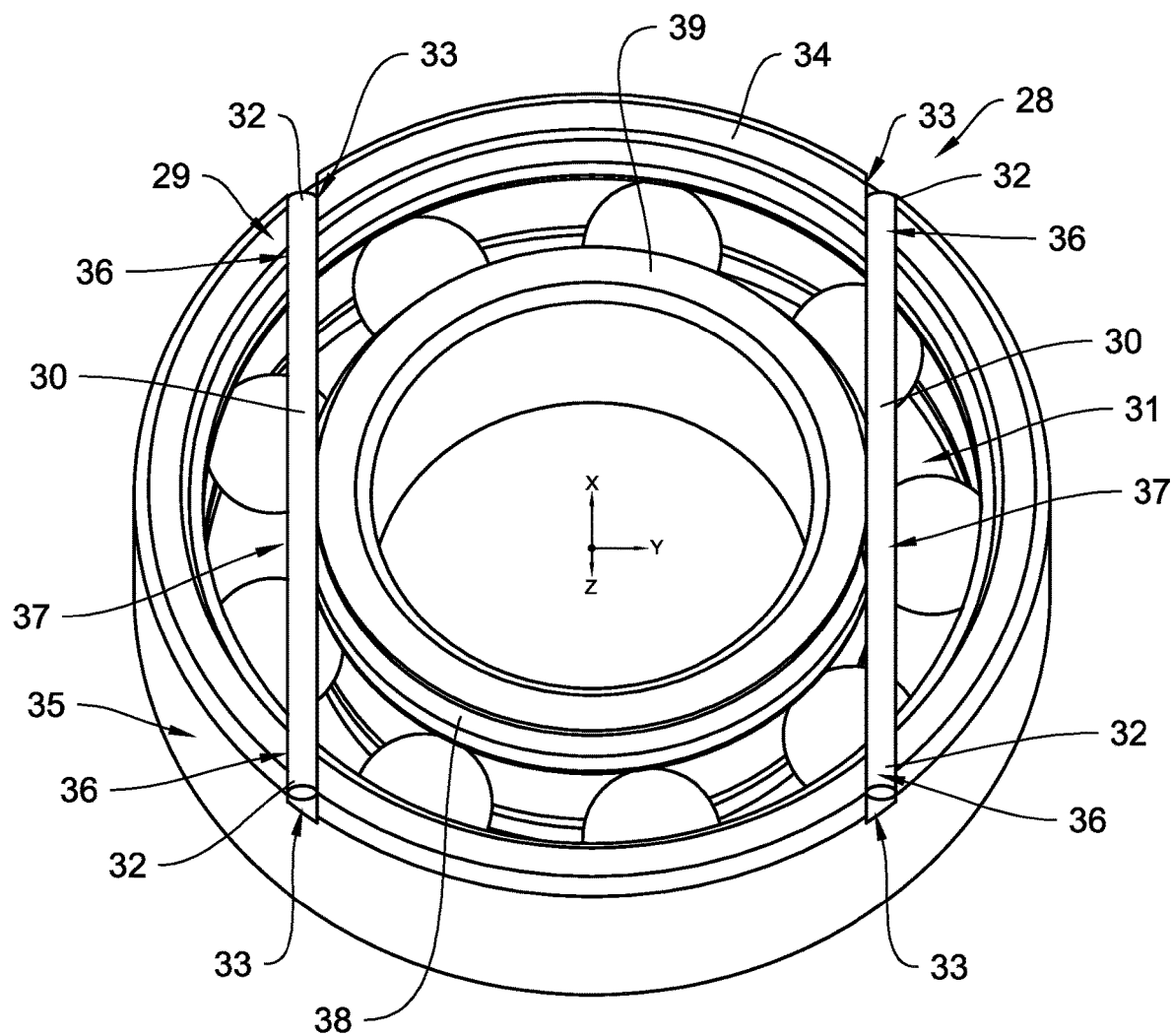
FIG. 2 shows a perspective view of a roller bearing in a second embodiment.

In contrast to FIG. 1, FIG. 2 shows a roller bearing 28 having a conduction apparatus 29 which comprises two conductors 30 in a conductor assembly 31, conductors 30 each being inserted into recesses 33 of a first bearing ring 34 of roller bearing 28 on opposite ends 32 of conductors 30. This enables forming a first conductor section 35 of each conductor 30 via two partial sections 36 on opposite ends 32 of conductor 30. A second conductor section 37 of conductor 30 is formed between partial sections 36 of conductor 30 in each instance. Second conductor section 37 is also placed in a groove 38 of a second bearing ring 39 of roller bearing 28. In this context, second conductor section 37 is disposed within groove 38 so as to be moveable, whereas partial sections 36 of first conductor section 35 is fixed in recesses 33.

The invention claimed is:

1. A roller bearing comprising a conduction apparatus, the conduction apparatus comprising at least one elastic conductor, the conductor having a first conductor section and a second conductor section for forming a contact assembly on the roller bearing, the first conductor section being mounted on a first bearing ring of the roller bearing and the second conductor section being mounted on a second bearing ring of the roller bearing, an electrically conductive connection being established between the first bearing ring and the second bearing ring by means of the conductor, wherein
the conductor is supported at the first bearing ring, the first conductor section being inserted into at least one straight recess of the first bearing ring.

2. The roller bearing according to claim 1, wherein the recess is formed so as to conform with the conductor.

3. The roller bearing according to claim 1, wherein the conductor is inserted into the recess in a force-fit, form-fit or substance-to-substance bonded manner.

4. The roller bearing according to claim 1, wherein the conductor is realized as a carbon fiber assembly made of a braid of carbon fibers, the carbon fiber assembly being infiltrated with pyrolytic carbon.

5. The roller bearing according to claim 1, wherein the first conductor section is formed by an end of the conductor, the second conductor section being formed by an opposite, free end of the conductor.

6. The roller bearing according to claim 1, wherein the first conductor section comprises two partial sections on opposite ends of the conductor, the partial sections each being inserted in recesses of the first bearing ring, the second conductor section being formed between partial sections inserted in the recesses.

7. The roller bearing according to claim 1, wherein the conductor is straight or curved.

8. The roller bearing according to claim 1, wherein a contact force is exerted on the second bearing ring by means of the conductor.

9. The roller bearing according to claim 8 wherein the contact force is caused by prestressing the conductor, the conductor being disposed on the bearing rings by producing the prestressing.

10. The roller bearing according to claim 1, wherein the roller bearing is an axial bearing.

11. The roller bearing according to claim 10, wherein the conductor is essentially parallel to a bearing axis of the roller bearing.

12. The roller bearing according to claim 1, wherein the roller bearing is a plain bearing, one of the first and second bearing rings is an outer ring, and the other of the first and second bearing rings is an inner ring, one of the first and second conductor sections being an outer conductor section for establishing contact with the outer ring of the plain bearing and the other of the first and second conductor sections being an inner conductor section for establishing contact with the inner ring of the plain bearing, the conductor being supported at the outer ring or at the inner ring.

13. The roller bearing according to claim 12, wherein an outer periphery of the inner ring or an inner periphery of the outer ring is contacted by means of one of the first and second conductor sections supported on a radial groove of the inner ring or the outer ring.

14. The roller bearing according to claim 12, wherein the conductor is tangential to the inner ring and/or secantial to the outer ring.

15. The roller bearing according to claim 12, wherein the straight recess is realized as a groove on at least a front face of the outer ring or the inner ring.

16. The roller bearing according to claim 1, wherein the conduction apparatus comprises two or more conductors in a conductor assembly, the first conductor sections of the conductors each being inserted in straight recesses of the first bearing ring.

17. The roller bearing according to claim 16, wherein the conductor is conductors are identical and are disposed on the bearing rings in a rotationally symmetric manner with respect to a bearing axis of the roller bearing.

18. The roller bearing according to claim 16, wherein the conductors are disposed on the first and second bearing rings in an axially symmetric manner with respect to a diameter of the bearing rings.

19. The roller bearing according to claim 16, wherein the conductors are disposed on the first and second bearing rings in an axially symmetric manner with respect to a diameter of the first and second bearing rings.

20. A method for conducting electrostatic charges at a roller bearing, the roller bearing comprising a conduction apparatus comprising at least one elastic conductor, the conductor being formed to have a first conductor section and a second conductor section for forming a contact assembly on the roller bearing, the first conductor section being mounted on a first bearing ring of the roller bearing and the second conductor section being mounted on a second bearing ring of the roller bearing, the conductor establishing an electrically conductive connection between the first bearing ring and the second bearing ring, wherein one of the first and second conductor sections is received in at least one straight recess formed in one of the first and second bearing rings.

* * * * *